United States Patent
Geist et al.

[11] Patent Number: 5,879,754
[45] Date of Patent: Mar. 9, 1999

[54] POLYETHER URETHANE, PROCESS FOR ITS PREPARATION, FLOW-OUT AGENT AND USE OF THE POLYETHER URETHANE

[75] Inventors: Michael Geist, Ludwigshafen; Gunther Ott; Helmut Fobbe, both of Munster; Klaus Arlt, Senden; Udo Strauss, Munster, all of Germany; Klaus Cibura, Southfield, Mich.

[73] Assignees: Basf Lacke; Farben Aktiengesellschaft, both of Munster, Germany

[21] Appl. No.: 293,906

[22] Filed: Aug. 22, 1994

Related U.S. Application Data

[63] Continuation of Ser. No. 5,923, Jan. 19, 1993, abandoned, which is a continuation of Ser. No. 391,528, Jul. 21, 1989, abandoned.

[30] Foreign Application Priority Data

Jan. 21, 1987 [DE] Germany .......................... 37 01 547.8
Jan. 20, 1988 [WO] WIPO ........................ PCT/EP88/0035

[51] Int. Cl.⁶ .............................. B05D 1/04; H05C 1/00; B29C 71/02; C08L 75/00
[52] U.S. Cl. ........................ 427/458; 427/473; 427/541; 523/456; 524/591; 524/839
[58] Field of Search ...................... 524/591, 839; 523/456; 427/458, 473, 541

[56] References Cited

U.S. PATENT DOCUMENTS

| | | |
|---|---|---|
| 2,917,486 | 12/1959 | Nelson et al. . |
| 4,009,307 | 2/1977 | Erikson et al. . |
| 4,046,729 | 9/1977 | Scriven ................... 524/591 |
| 4,136,070 | 1/1979 | Hazan ..................... 524/901 |
| 4,137,276 | 1/1979 | Sirota . |
| 4,155,892 | 5/1979 | Emmons et al. ......... 524/591 |
| 4,278,580 | 7/1981 | Schmölzer et al. ...... 525/507 |
| 4,292,226 | 9/1981 | Wenzel et al. .......... 524/591 |
| 4,522,986 | 6/1985 | Short et al. . |
| 4,548,965 | 10/1985 | Gerst et al. ............. 523/456 |
| 4,616,061 | 10/1986 | Henning et al. ........ 524/591 |
| 4,742,095 | 5/1988 | Markusch et al. ...... 524/839 |
| 4,745,151 | 5/1988 | Noll et al. ............... 524/591 |
| 4,939,226 | 7/1990 | Schipfer et al. ........ 524/839 |

*Primary Examiner*—Patrick D. Niland
*Attorney, Agent, or Firm*—Kenyon & Kenyon

[57] ABSTRACT

The invention relates to a polyether urethane of the general formula

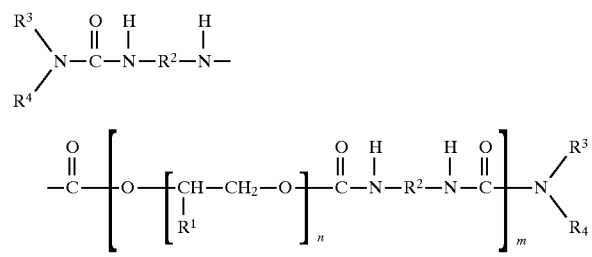

wherein $R^1$ denotes H or an alkyd (sic) radical of 1 to 8 carbon atoms, $R^2$ denotes an alkylene radical of 2 to 10 carbon atoms or a cycloalkylene radical of 6 to 20 carbon atoms or an arylene radical of 6 to 20 carbon atoms, $R^3$, $R^4$ denote an optionally substituted alkyl radical of 1 to 8 carbon atoms or a joint ring whose members are $R^3$ and $R^4$, n denotes 2 to 1800 m denotes 1 to 15.

The invention further relates to a process for its preparation, to a flow-out agent for water-borne paints and to the use of the polyether urethanes as flow-out agents in water-borne, cathodically depositable electro-coating paints.

12 Claims, No Drawings

POLYETHER URETHANE, PROCESS FOR ITS PREPARATION, FLOW-OUT AGENT AND USE OF THE POLYETHER URETHANE

This application is a Continuation of Ser. No. 08/005,923, Jan. 19, 1993, now abandoned; which is a Continuation of Ser. No. 07/391,528, filed Jul. 21, 1989, now abandoned.

The invention relates to a polyether urethane, to a process for its preparation, to a flow-out agent and to the use of the polyether urethane.

Cationic electrocoating (CEC) is a painting process frequently used especially for priming, in particular for priming of motor vehicles; in this process, water-dilutable synthetic resins carrying cationic groups are deposited on electrically conducting objects with the aid of direct current.

Electrocoating baths of the above type are disclosed in, for example, the following patents: U.S. Pat. No. 3,799,854; U.S. Pat. No. 3,984,299; U.S. Pat. No. 4,031,050; U.S. Pat. No. 4,252,703; U.S. Pat. No. 4,332,711 and DE-PS 3,108,073.

It is known that high-quality coatings are obtainable with this type of paint system.

A shortcoming of all these systems, however, is their sensitivity to impurities which contaminate the CEC baths. There are a variety of sources of the interfering substances. For example, in automotive manufacture the CEC baths may be contaminated with deep drawing greases, anticorrosion greases, seam sealing materials, lubricating greases used in the conveying machinery etc. In the deposition of the paint, these impurities become incorporated in the film. When the paint film is baked, incompatibility between the paint binder and the impurity then gives rise to film defects such as craters and the like, well known to the person skilled in the art.

Very extensive attempts were made in the past to overcome the incompatibility by means of additives or to formulate defect-resistant paints. One such possibility lies in the use of silicone oils. These can be either miscible or immiscible with water. They can also be modified by reactive groups, for example by hydroxyl or amino groups. This group of additives has, however, one feature in common, viz. that they are capable of eliminating surface defects but at the same time usually creating serious adhesion problems for subsequent coats of paint such as fillers and topcoats.

Attempts have accordingly been made to improve the resistance to contamination of CEC binders via suitable organic resins. Japanese Patent Application J 61,115,974 discloses a reaction product of a polyepoxy resin modified with dimeric fatty acid, with polyoxyalkylene polyamine. This product is alleged to suppress the tendency of CEC materials to crater formation. EP 70,550 discloses a reaction product of a polyepoxy resin with a polyoxyalkylene polyamine having primary amino groups. This material is likewise alleged to improve CEC films by eliminating or at least minimizing their tendency to crater formation. However, these products Likewise give rise to persistent inter-adhesion problems for fillers and topcoats.

It is the object of the present invention to put forward novel polyether urethanes which are suitable as flow-out agents, as well as a process for their preparation.

It has now been found, surprisingly, that these problems as defined above are eliminated when a product is made available that reduces the tendency to crater formation in CEC binders on account of its chemical structure and at the same time is capable of reacting via its functional groups with the crosslinking agent in the CEC binder during the baking process. These additives are reaction products of polyalkyl ether diols with aromatic and/or aliphatic diisocyanates in the approximate molar ratio of n: (n+1); the residual isocyanate groups are further modified in a second reaction step by reaction with secondary amines.

Accordingly, the subject of the invention is a polyether urethane of the general formula

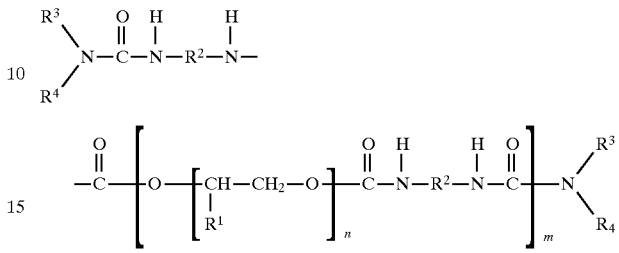

wherein $R^1$ denotes H or an alkyd (sic) radical of 1 to 8 carbon atoms, $R^2$ denotes the (sic) alkylene radical of 2 to 10 carbon atoms or a cycloalkylene radical of 6 to 20 carbon atoms or an arylene radical of 6 to 20 carbon atoms, $R^3$, $R^4$ denote an optionally substituted alkyl radical of 1 to 8 carbon atoms or a joint ring whose members are $R^3$ and $R^4$, n denotes 2 to 180, m denotes 1 to 15.

The invention further relates to a process for the preparation of a polyether urethane, in which process a polyalkylene ether diol is reacted with an excess of aromatic and/or aliphatic diisocyanates to form an intermediate possessing terminal isocyanate groups and these isocyanate groups are further reacted with secondary amines; to a flow-out agent for water-borne paints consisting of, or containing, the polyether urethane according to the invention; and to the use of the said polyether urethane in water-borne cathodically depositable electrocoating paints in particular.

The polyalkylene ether diols are reaction products of water, aliphatic or aromatic diols and monoepoxides. In the reaction, the molecular weight can be varied within a wide range with the aid of stoichiometry. For the purpose of the invention, molecular weights between 500 and 800Q are preferred; molecular weights between 1000 and 5000 are preferred in particular. A person skilled in the art will be familiar with suitable monoepoxides. Examples of these are ethylene oxide, propylene oxide and butylene oxide. These can be used either on their own or as a mixture. If it is desired to produce a polyalkylene ether from various monoepoxides, a person skilled in the art will be familiar with the possibilities of building up statistical or block copolymers.

In principle, all aliphatic diols are suitable as the aliphatic diols, preference being given to diols possessing primary hydroxyl groups, such as ethylene glycol or diethylene glycol.

Resorcinol, bisphenol A and bisphenol F, in particular, have been found satisfactory as the aromatic diols.

Aromatic and aliphatic diisocyanates are suitable for chain lengthening of the polyalkylene ether diols. A person skilled in the art will be likewise familiar with these classes of substances, so that only a few suitable types need be named as representatives. Toluylene diisocyanate, 4,4'-diisocyanatodiphenylmethane, hexamethylene diisocyanate and isophorone diisocyanate belong to these. These isocyanates are reacted at room or elevated temperatures, if desired in the presence of solvents which are incapable of reacting with isocyanate groups. The reaction may be accelerated by means of catalysts customarily used for the isocyanatehydroxyl groups-reaction. Organic compounds of tin, such as dibutyl tin dilaurate, are particularly suitable.

The polyalkylene ether diols are reacted with the diisocyanates in such stoichiometric proportions that the intermediate has available terminal isocyanate groups. In general, the polyalkylene ether to diisocyanate ratio is expressed approximately as n: (n+1).

These terminal isocyanate groups are then further reacted with secondary amines in a subsequent reaction step. Suitable secondary amines are the dialkylamines such as dimethylamine or dibutylamine, the alkylalkanolamines such as methylethanolamine or ethylethanolamine, the dialkanolamines such as diethaholamine. Polyamines having one secondary amino group, the remainder of amino groups being primary, are likewise suitable. Prior to the reaction with the intermediates containing the isocyanate groups, however, the primary amino groups must be blocked to prevent undesirable chain lengthening or gelling. One of the best known methods for blocking primary amino groups is reaction with ketones. The diketimine formed from diethylenetriamine and methyl isobutyl ketone is an example of a polyamine modified in this manner. After transferring the additive to the aqueous medium, the ketimine groups are decomposed again by cleavage with water, ie. the additive then again displays primary amino groups.

The additives can be added during the preparation of the CEC binders, but they can also be transferred separately to the aqueous solution by the addition of organic acids and water. This aqueous solution can then be added to the CEC bath as required in suitable amounts, preferably between 1 and 20 parts by weight of the additive (solids) based on the CEC binder (solids).

The preparation according to the invention and the use of the flow-out agents are illustrated by the examples below. However, these are not intended to limit the scope of the invention.

EXAMPLES

The CEC binders and pigment pastes used correspond to Example 2 (binder dispersion) of DE-PS 3,108,073 and to Example 7 (pigment paste) of EP 102,501 B1 respectively.

1. Preparation of the additives

General synthesis method

The diisocyanate and methyl isobutyl ketone (MIBK) are introduced, under nitrogen, in a suitable reaction vessel, the mixture is warmed to 50° C. and treated with dibutyl-tin dilaurate. The polyalkylene ether diol is then run in at such a rate that the temperature does not rise above 70° C. As soon as the theoretical NCO equivalent weight is reached, the secondary amine is added.

The temperature is allowed to rise to 90° C. and is maintained at this level until all isocyanate groups have reacted.

Additive I 243.1 parts of hexamethylene diisocyanate 364.6 parts of methyl isobutyl ketone (MIBK)

0.5 parts of dibutyl tin dilaurate 1162.8 parts of Pluriol PE 3100[1]

349.7 parts of ketimine [2]

1) Pluriol PE 3100: a polyalkylene ether diol from BASF AG, a copolymer based on ethylene oxide/propylene oxide, molecular weight 1100
2) Ketimine: reaction product of diethylenetriamine with MIBK in the presence of MIBK excess, amine equivalent 130.

Additive II 122.4 parts of hexamethylene diisocyanate 377.6 parts of MIBK 0.5 parts of dibutyl tin dilaurate 1300.8 parts of Pluriol PE 6200[1]

89.4 parts of ketimine [2]

34.3 parts of methylethanolamine

1) Pluriol PE 6200: a polyalkylene ether diol from BASF AG, a copolymer based on ethylene oxide/propylene oxide, molecular weight 2500
2) Ketimine see additive I Additive III 190.7 parts of hexamethylene diisocyanate 309.3 parts of MIBK 0.5 parts of dibutyl tin dilaurate 1045.3 parts of Dianol 3310[1]

105.6 parts of ketimine[2]

1) Dianol 3310: a polyalkylene ether diol from AKZO based on ethoxylated bisphenol A, molecular weight 1020
2) Ketimine: see additive I 2. Mixing of the dispersions with the additives The preparation of the binder dispersion is described in Example 2 of DE-PS 3,108,073. This dispersion without any additives is used as comparison dispersion.

Dispersion Ia 203.5 parts of the additive I are mixed with 7.22 parts of glacial acetic acid and 338.1 parts of deionized water. This additive mixture is then slowly stirred into 4500 parts of binder dispersion. The solids content is then adjusted to 30% with further 1193.2 parts of water. The additive content amounts to 9.5% of solids based on solids.

Dispersion Ib

The preparation is carried out in an analogous manner to Ia. The initial weights are:

278.4 parts of additive I 9.88 parts of glacial acetic acid 462.5 parts of deionized water 4500.0 parts of binder dispersion 1205.4 parts of deionized water The additive contents amounts to 13% of solids based on solids.

Dispersion IIa

The preparation is carried out in an analogous manner to Ia. The initial weights are:

130.9 parts of additive II 3.63 parts of glacial acetic acid 211.2 parts of deionized water 4500.0 parts of binder dispersion 1194.4 parts of deionized water The additive content amounts to 6% of solids on solids.

Dispersion IIb

The preparation is carried out in an analogous manner to Ia. The initial weights are:

207.2 parts of additive II 5.75 parts of glacial acetic acid 334.2 parts of deionized water 4500.0 parts of binder dispersion 1193.2 parts of deionized water The additive content amounts to 9.5% of solids on solids.

Dispersion IIIa

The preparation is carried out in an analogous manner to Ia. The initial weights are:

128.7 parts of additive III 2.52 parts of glacial acetic acid 213.3 parts of deionized water
4500.0 parts of binder dispersion
1194.4 parts of deionized water
The additive content amounts to 6% of solids on solids.

Dispersion IIIb

The preparation is carried out in an analogous manner to Ia. The initial amounts are:

278.8 parts of additive III
5.45 parts of glacial acetic acid
462.2 parts of deionized water
4500.0 parts of binder dispersion
1205.4 parts of deionized water
The additive content amounts to 13% of solids on solids.

3. Preparation of the coating baths 1675 parts of deionized water are introduced in a suitable container and mixed with 25 parts of 10% acetic acid. 2279 parts of the binder dispersion and 775 parts of the pigment paste are stirred in and the final volume is made up with 246 parts of deionized water. The coating baths are allowed to age for 3 days from paint deposition.

4. Paint deposition

The films were deposited on zinc phosphated steel panels, connected as cathode, for 2 minutes at 300 V. Following the usual aftertreatment, the films were baked at 175° C. for 20 minutes.

5. Deposition results

| Dispersion | Ia | Ib | IIa | IIb | IIIa | IIIb | Comparison |
|---|---|---|---|---|---|---|---|
| Film thickness($\mu$m) | 32 | 35 | 30 | 32 | 31 | 34 | 31 |
| Flow-out[1] | 1 | 0.5 | 0.5 | 0 | 0.5 | 0 | 1.5 |
| Craters/dm$^2$ | 0 | 0 | 0.5 | 0 | 0.5 | 0 | 2 |

[1]Flow-out: 0 (good) to 5 (poor)

These films were then provided with a commercial waterborne filler and a white alkyd topcoat and tested in condensed water/constant climate conditions for 240 hours. The adhesion of the films was then tested by the cross-hatch and Tesa pull-off tests.

| Dispersion | Ia | Ib | IIa | IIb | IIIa | IIIb | Comparison |
|---|---|---|---|---|---|---|---|
| Adhesion[1] | 0.5 | 0 | 0.5 | 0 | 1 | 0 | 0.5 |

[1]0 (good) to 5 (poor)

The CEC baths were then contaminated with 0.1% of ASTM oil. The oil was added to the baths over one day with stirring. Paint was then deposited from the baths as described above.

| Dispersion | Ia | Ib | IIa | IIb | IIIa | IIIb | Comparison |
|---|---|---|---|---|---|---|---|
| Craters/dm$^2$ | 2 | 0 | 4 | 1 | 2 | 2 | 50 |

We claim:

1. A method for reducing surface defects in electrodeposited films on electrically conducting substrates comprising:

(1) immersing the substrate in an aqueous electrocoating bath containing at least one synthetic resin to be deposited on a cathode, surface-defect-forming contaminants and a polyether urethane present in an amount effective to reduce defect formation by the contaminants, the polyether urethane being prepared by the process of:

(a) reacting a polyalkylene ether diol with an excess of an aromatic or (cyclo)aliphatic diisocyanate to produce an intermediate product possessing terminal isocyanate groups and (b) reacting the terminal isocyanate groups of the intermediate product with a secondary amine to produce the polyether urethane;

(2) connecting the substrate as the cathode;

(3) electrodepositing a film on the substrate;

(4) removing the substrate from the electrocoating bath; and (5) baking the deposited paint film to provide a coating substantially free of surface defects caused by contaminants.

2. The method of claim 1 wherein the polyether urethane is present in the cathodic electrodeposition bath in an amount effective to reduce crater formation in the cathodically electrodeposited coating.

3. The process of claim 1 wherein the polyether urethane is in an amount from about 6% to 13% by weight based on the total solid content of the cathodic electrodeposition bath.

4. The method according to claim 1 wherein said contaminant is an oil.

5. The method according to claim 1 wherein said contaminant is a fat.

6. The method according to claim 1 wherein the polyalkylene ether diol is a copolymer made from ethylene oxide and propylene oxide.

7. The method according to claim 1 wherein the diisocyanate is comprised of an aliphatic diisocyanate.

8. The method according to claim 1 wherein the diisocyanate is comprised of an aromatic diisocyanate.

9. The method according to claim 1 wherein the diisocyanate is comprised of a mixture of an aliphatic diisocyanate and an aromatic diisocyanate.

10. The method according to claims 6, 7, 8, or 9 wherein the secondary amine is comprised of an alkylalkanolamine or a dialkanolamine.

11. The method according to claim 1 wherein the secondary amine further contains at least one blocked primary amino group.

12. The method according to claim 1 wherein the polyalkylene ether diol is the reaction product of an aliphatic or aromatic diol and a monoepoxide.

* * * * *